United States Patent
Sun (10) Patent No.: US 8,005,484 B2
(45) Date of Patent: Aug. 23, 2011

(54) METHOD AND SYSTEM FOR PROVIDING LOCATION INFORMATION

(75) Inventor: Qian Sun, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 855 days.

(21) Appl. No.: 11/867,871

(22) Filed: Oct. 5, 2007

(65) Prior Publication Data

US 2008/0045239 A1 Feb. 21, 2008

(30) Foreign Application Priority Data

Sep. 14, 2005 (CN) .......................... 2005 1 0102924

(51) Int. Cl.
*H04M 3/42* (2006.01)
(52) U.S. Cl. ................................. 455/456.1; 455/414.2
(58) Field of Classification Search ............... 455/456.1, 455/566, 414.2, 415
See application file for complete search history.

(56) References Cited

U.S. PATENT DOCUMENTS

| 6,574,335 B1 | 6/2003 | Kalmanek et al. | |
|---|---|---|---|
| 7,493,125 B2 * | 2/2009 | Nagesh et al. | 455/456.1 |

FOREIGN PATENT DOCUMENTS

| CN | 1529526 A | 9/2004 |
|---|---|---|
| CN | 1553720 A | 12/2004 |
| CN | 1558692 A | 12/2004 |
| CN | 1658632 A | 8/2005 |
| EP | 1517527 A | 3/2005 |
| JP | 2000-050347 A | 2/2000 |
| JP | 2006074133 A | 3/2006 |
| KR | 2003-008736 A | 1/2003 |
| KR | 2005-0083247 | 8/2005 |
| WO | 2004/032547 A1 | 4/2004 |
| WO | WO 2005/081509 A1 | 9/2005 |

OTHER PUBLICATIONS

Written Opinion of the International Searching Authority dated Sep. 21, 2006 in connection with International Patent Application No. PCT/CN2008/001286.
Partial Translation of Office Action dated Oct. 16, 2009 in connection with Chinese Patent Application No, 200680012194.0.
Partial Translation of Office Action dated Aug. 22, 2008 in connection with Chinese Patent Application No. 200510102924.3.

* cited by examiner

*Primary Examiner* — George Eng
*Assistant Examiner* — Nizar Sivji (57) ABSTRACT

Embodiments of the present invention provide a method and system for providing location information. When a call is initiated, the call is connected to the ring back tone device when there is a subscription record of ring back tone location service corresponding to a user of the call; the ring back tone device acquires the location information of the terminal of the called party from the location service platform and sends the location information to the terminal of the calling party. The embodiments of the present invention provide great convenience to users. Further, the location service and the customized ring back tone service are enriched greatly and thus the service experience of users is enhanced, since location information may be sent by the ring back tone device to the terminal of calling party in forms, such as characters, voices and multimedia.

4 Claims, 3 Drawing Sheets

METHOD AND SYSTEM FOR PROVIDING LOCATION INFORMATION

FIELD OF THE TECHNOLOGY

The present invention relates to network communication technologies, and particularly, to a method and system for providing location information.

BACKGROUND OF THE INVENTION

Location service is a service providing a positioning service to individuals and industrial users. When a user (i.e. the calling party) needs to inquire about location information of another user subscribing to a location service (i.e. the called party), a location service platform in the network acquires the location information of the mobile terminal of the called party by specific positioning technologies and provides the location information to the calling party.

The positioning technologies of a location service platform are mainly positioning technologies based on mobile communication networks or positioning technologies based on mobile terminals. When using the positioning technologies based on mobile communication networks, the location service platform may acquire the location information of the mobile terminal of the called party according to a preset corresponding relation between the identifier of a cell and its geographical location information because the identifier of a cell will be reported to the location service platform after the mobile terminal of the called party enters the cell covered by a base station. When using the positioning technologies based on mobile terminals, the mobile terminal of the called party is a mobile terminal with a satellite positioning function, and the mobile terminal of the called party uses the positioning satellite to position itself and sends the positioning information such as the longitude and latitude information to the location service platform. The location service platform acquires, according to the positioning information, the location information of the mobile terminal of the called party, such as the name of the road where the called party is located.

Currently, location information of a called party could be provided to a calling party through a short message. A first short message sent by the calling party includes the called number, and the receiver of the first short message is set as a specific number of location service by the calling party, a short message service center receives the first short message. The short message service center sends an inquiry request containing the called number to the location service platform according to the specific number of location service. The location service platform acquires the location information of the called party with the positioning technology mentioned above and sends the location information to the short message service center. The short message service center sends a second short message including the location information to the calling party. The calling party acquires the location information of the called party based on the second short message.

The process for providing the location information of the called party to the calling party through a short message mentioned above, the calling party should remember the specific number of the location service. However, the calling party is usually not familiar to the specific number of the location service and may not remember the specific number of the location service easily, it is difficult and inconvenience for users to implement the location service. Further, the calling party should enter the corresponding short message interface of his mobile terminal and performs a series of fussy processes of inputting contents of a short message, which further brings inconvenience to the users. Further, the mode that the calling party obtains the location information of the called party through a short message is tedious and not friendly enough and decreases the service experience for the users.

SUMMARY OF THE INVENTION

The embodiments of the present invention provide a method and system for providing location information. It is convenient for a user to acquire location information of the terminal of a called party.

An embodiment of the present invention provides a method for providing location information, including:
receiving, by a ring back tone device, a call;
sending a positioning request containing a called number of the call;
receiving location information of a terminal of a called party based on the called number; and
sending a ring back tone according to the location information of the terminal of the called party to a calling party of the call.

Another embodiment of the present invention provides system for providing location information, including:
a switch and control system, capable of switching and controlling communication between a calling party and a called party, and connecting a call;
a ring back tone device, capable of receiving the call from the switch and control system, sending a positioning request containing a called number, receiving location information of a terminal of the called party, and sending a ring back tone according to the location information to a calling party; and
a location service platform, capable of receiving the positioning request containing the called number from the ring back tone device, acquiring the location information of the terminal of the called party based on the called number in the positioning request, and sending the location information to the ring back tone device.

Another embodiment of the present invention provides a system for playing a ring back tone, including:
a ring back tone management unit, capable of receiving a call, managing transmission of a ring back tone to a calling party, acquiring a called number from the call, sending the called number, and sending location information of a terminal of a called party to the calling party as a ring back tone; and
a location information acquirement unit, capable of sending a positioning request containing the called number upon receiving the called number from the ring back tone management unit, and sending the location information of the terminal of the called party to the ring back tone management unit upon receiving the location information of the terminal of the called party.

As the embodiments mentioned above, a calling party could acquire specific location information of a called party by dialing the number of the mobile terminal of the called party which is familiar to the calling party instead of inputting a specific number of a location service. Therefore, it is convenient for a user to acquire the location information of a called party.

The calling party dials the number of the mobile terminal of the called party and does not need to perform a series of fussy operations. Therefore, great convenience is brought to the user.

According to the embodiments of the present invention, the ring back tone device may send location information to the calling party in various formats, such as characters, voice and multimedia, rather than the tedious format of a short message in the prior art. Thus the location service and the customized ring back tone service are enriched greatly and the service experience of users is enhanced.

DETAIL DESCRIPTION OF THE INVENTION

Currently, when implementing location service, a calling party should input a number of the mobile terminal of a called party and input a specific number of the location service. However, the calling party is usually not familiar with the specific number of the location service and it is difficult for the calling party to remember the specific number of the location service, thus great inconvenience is brought to the calling party. If the calling party may acquire location information of the mobile terminal of the called party by inputting the number of the mobile terminal of the called party which is familiar to the calling party instead of remembering and inputting the specific number of the location service, the operations of the calling party will be simplified and great convenience is brought to the calling party.

As mentioned above, an embodiment of the present invention provides a method for providing location information. According to the embodiment of the present invention, a subscription record of ring back tone location service corresponding to a user is stored in advance and the ring back tone device could be connected to the location service platform. When a call is initiated, if a user of the call subscribes to a ring back tone location service, the call is connected to the ring back tone device. The ring back tone device sends a positioning request containing a called number to the location service platform. The location service platform acquires location information of the terminal of the called party according to the called number in the positioning request, and sends the location information of the terminal of the called party to the ring back tone device. The ring back tone device sends the location information of the terminal of the called party to the calling party as a ring back tone.

A ring back tone device in an embodiment of the present invention may be called a ring back tone server or a customized ring back tone server. Further, the ring back tone device provides a ring back tone containing the location information of the terminal of the called party to the terminal of the calling party as well as an ordinary ring back tone customized by a user (i.e. the customized ring back tone and individualized ring back tone, etc.). The ring back tone containing the location information of the terminal of the called party is acquired by the ring back tone device from the location service platform. To be distinguished from the ring back tone as the location information of the terminal of the called party, a ring back tone provided by the existing customized ring back tone service is called an ordinary customized ring back tone.

For example, the ring back tone device may be an Intelligent Peripheral (IP) or a dedicated Ring Back Tone Server (RBTS). Further, in an embodiment of the present invention, when a call is connected to the ring back tone device, an identifier of a ring back tone location service may be further sent to the ring back tone device to notify that it is a ring back tone location service. In other words, the location information of the terminal of the called party may be played to the terminal of the calling party. Accordingly, upon receiving the identifier of the ring back tone location service, the ring back tone device perform the subsequent service process, i.e., sends a positioning request to the location service platform and sends to the terminal of the calling party the location information of the terminal of the called party sent by the location service platform as a ring back tone. If the ring back tone device does not receive the identifier of the ring back tone location service or receives the identifier of an ordinary customized ring back tone service, the ring back tone device may process the call according to the process of playing an ordinary customized ring back tone. Further, in an embodiment of the present invention, the process of paging the called party, which is performed simultaneously when the ring back tone is sent, is the same as that in the prior art and will not be described herein.

In an embodiment of the present invention, the location information of the terminal of the called party acquired by the location service platform is generally the longitude-latitude coordinates of the area where the called party is located. In an embodiment of the present invention, both the location service platform and the ring back tone device may directly send, to the terminal of the calling party without any other processing, the longitude-latitude coordinates of the area where the terminal of the called party is located. The terminal of the calling party may acquire the specific geographical information of the area where the terminal of the called party is located based on relation between the longitude-latitude coordinates and the geographical area environment, such as a geographical name and/or a building name. For example, the relation may be stored in the terminal of the calling party in advance. In an embodiment of the present invention, the longitude-latitude coordinates of the area where the terminal of the called party is located may also be converted to location information in the user understandable form and be sent to the terminal of the calling party. The process of converting may be performed by the location service platform or the ring back tone device. When the process of converting is performed by the location service platform, the Geographical Information System (GIS) should be configured in the location service platform in advance, and the location service platform implements the process of converting according to the GIS. Alternatively, when the process of converting is performed by the ring back tone device, the GIS should be configured in the ring back tone device in advance, and the ring back tone device implements the process of converting according to the GIS.

Figure 1:
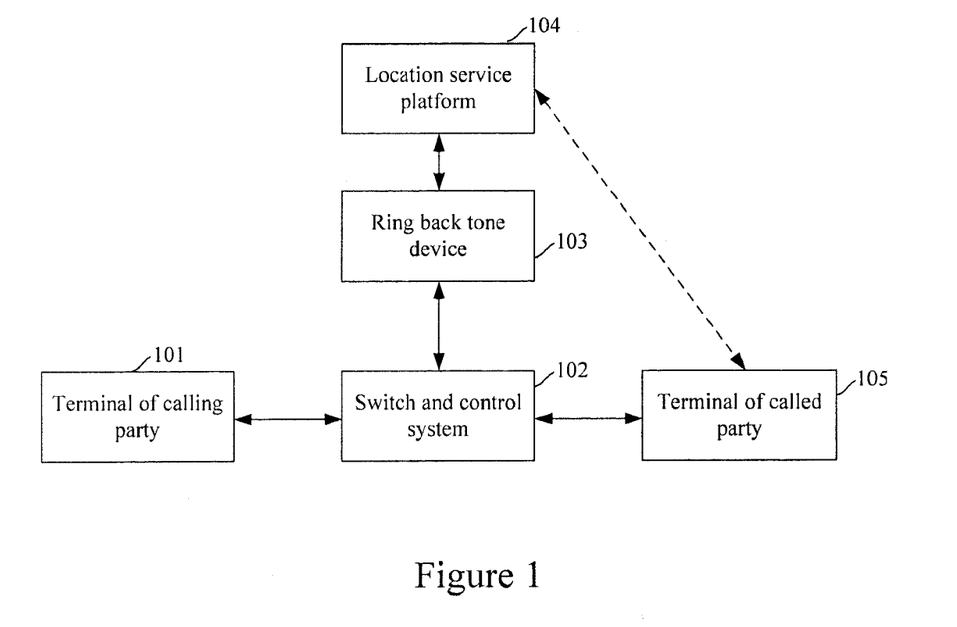
FIG. 1 shows a schematic diagram illustrating the structure of a system in accordance with an embodiment of the present invention.

Accordingly, an embodiment of the present invention also provides a system for providing location information. As shown in FIG. 1, the system for providing location information includes a terminal of calling party 101, a switch and control system 102, a ring back tone device 103, a location service platform 104 and a terminal of called party 105. The switch and control system 102 is connected to the terminal of calling party 101, the ring back tone device 103 and the terminal of called party 105 respectively. The location service platform 104 is connected to the ring back tone device 103 and the terminal of called party 105 respectively.

The switch and control system 102 switches and controls communications between the terminal of calling party 101 and the terminal of called party 105, stores a subscription record of ring back tone location service of a user, receives a call, and connects the call to the ring back tone device 103 if a user of the call subscribes to a ring back tone location service.

The ring back tone device 103 sends to the location service platform 104 a positioning request containing the called number upon receiving the call, receives location information from the location service platform 104, and sends to the terminal of calling party 101 the location information.

The location service platform 104 receives the positioning request, acquires the location information of the terminal of called party 105 according to the called number in the positioning request, and sends the location information to the ring back tone device 103.

In the system of the present invention, the switch and control system 102 may include a Mobile Switching Center (MSC) and a Home Location Register (HLR).

The HLR stores a subscription record of ring back tone location service of a user and the route address of the ring back tone device 103. The MSC acquires the record of ring back tone location service and the route address of the ring back tone device 103 from the HLR, and connects the call to the ring back tone device 103 according to the route address of the ring back tone device 103 if a user of the call subscribes to a ring back tone location service.

The switch and control system 102 may further include a switching device and a Service Control Point (SCP).

The switching device receives the call, reports information of the call to the SCP, and connects the call to the ring back tone device 103 upon receiving the route address of the ring back tone device 103 sent by the SCP.

The SCP stores the subscription record of ring back tone location service of a user and the route address of the ring back tone device, and instructs, the switching device to connect the call to the ring back tone device according to the route address of the ring back tone device upon determining that there is the subscription record of ring back tone location service corresponding to the user of the call according to the information of the call, that is, the user of the call subscribes to a ring back tone location service.

In the system according to an embodiment of the present invention, the location service platform 104 may be set in the ring back tone device 103, or the location service platform 104 and the ring back tone device 103 may be two separate network entities and connected to each other via a Local Exchange (Le) interface. The Le interface protocol is an application layer protocol for inquiring about the location information of a mobile terminal, and the Le interface is an interface between the location service platform 104 and the location application. Details of the Le interface are referred to in the specifications related to the Location Services defined by the $3^{rd}$ Generation Partnership Project (3GPP) and the Open Mobile Alliance (OMA).

Further, because the location information of the terminal of called party 105 is generally the longitude-latitude coordinates of the area where the terminal of called party is located, the longitude-latitude coordinates may be converted into the location information in a user understandable form, such as the name of a geographical area or the name of a building corresponding to the longitude-latitude coordinates by setting the GIS in the ring back tone device 103 whether the location service platform 104 is set in the ring back tone device 103 or not. After the location service platform 104 acquires the longitude-latitude coordinates of the terminal of called party 105 and sends the longitude-latitude coordinates to the ring back tone device 103, the GIS set in the ring back tone device may convert the longitude-latitude coordinates into the location information in the user understandable form, and the ring back tone device 103 may send to the terminal of calling party 101 the location information of the terminal of called party in the user understandable form.

In the case that the location service platform 104 is separate from the ring back tone device 103, in the system of an embodiment of the present invention, a GIS may be further set in the location service platform 104. Upon acquiring the longitude-latitude coordinates of the terminal of called party 105, the GIS set in the location service platform 104 may convert the longitude-latitude coordinates into the location information in a user understandable form, and the location service platform may send to the ring back tone device 103 the location information of the terminal of called party 105 in the user understandable form. The ring back tone device 103 sends the location information of the terminal of called party 105 in the user understandable form to the terminal of calling party 101.

To make technical solutions and advantages of the present invention clearer, embodiments of the present invention are hereinafter described in detail with reference to the drawings.

The switch and control system 102 may include an MSC and an HLR, and the location service platform converts the longitude-latitude coordinates of the area where the terminal of called party is located into the location information of the terminal of called party in a user understandable form and sends the location information of the terminal of called party in the user understandable form to the terminal of calling party via the ring back tone device, the detailed implementation process of the present invention is described as follows.

Figure 2:
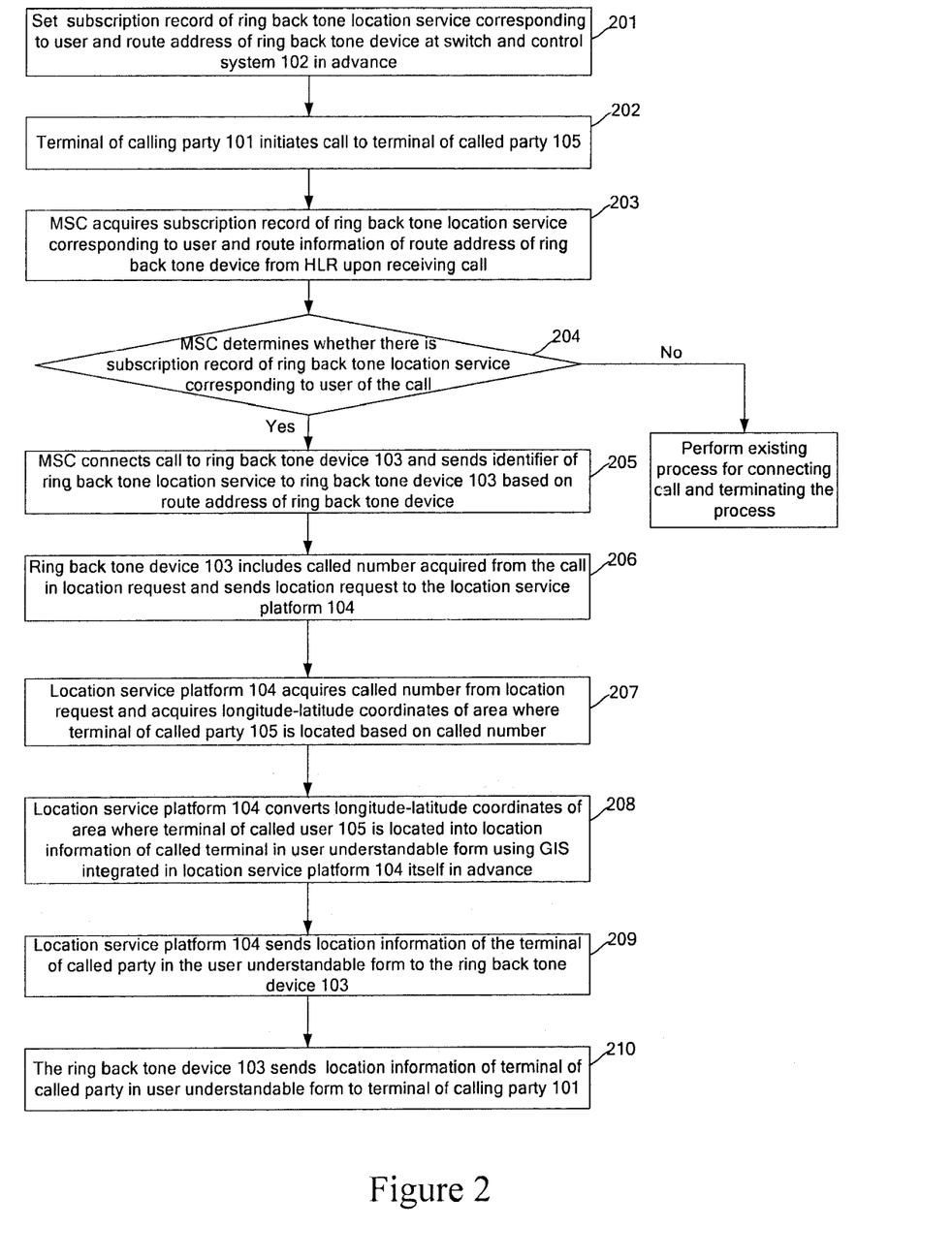
FIG. 2 shows a flow chart in accordance with an embodiment of the present invention.

FIG. 2 shows a flowchart in accordance with an embodiment of the present invention. As shown in FIG. 1 and FIG. 2, with the system of the present invention, the process for providing location information in accordance with an embodiment of the present invention is described below.

In Block 201, a subscription record of ring back tone location service corresponding to a user and a route address of the ring back tone device 103 are set in the switch and control system 102 in advance.

In this Block, the subscription record of ring back tone location service of the user and the route address of the ring back tone device are set in the HLR. And the subscription record of ring back tone location service of the user is set for a user subscribing to the location service. In other words, a user subscribing to the location service has the subscription record of ring back tone location service.

In Block 202, a terminal of calling party 101 initiates a call to a terminal of called party 105.

In Block 203, upon receiving the call, the MSC acquires the subscription record of ring back tone location service of the user and the route address of the ring back tone device from the HLR.

In Block 204, the MSC determines whether there is the subscription record of ring back tone location service corresponding to the user of the call; if yes, Block 205 is performed, otherwise, the existing process for connecting a call is performed and the process of this embodiment is terminated.

In this Block, the user of the call is the calling party and/or the called party, i.e., the process of determining in this Block includes: the MSC determines, based on the calling number and the subscription record of ring back tone location service of a user acquired from the HLR, whether there is the subscription record of ring back tone location service corresponding to the calling party of the call; and/or the MSC determines, based on the called number and the subscription record of ring back tone location service corresponding to a user acquired from the HLR, whether there is the subscription record of ring back tone location service corresponding to the called party of the call. Upon determining that there is the subscription record of ring back tone location service corresponding to the user of the call, the MSC learns that the user of the call is a location service user, i.e., the call service is a ring back tone location service, and accordingly the subsequent Blocks are performed, i.e., the process for providing location information is performed.

In Block 205, the MSC connects the call to the ring back tone device 103 and sends an identifier of the ring back tone location service to the ring back tone device 103 according to the route address of the ring back tone device 103.

In this Block, the MSC sends the identifier of the ring back tone location service to the ring back tone device 103 to notify that this service is not an ordinary customized ring back tone service but a service providing location information through a ring back tone.

In Block 206, upon receiving the call and the identifier of the ring back tone location service, the ring back tone device 103 determines that it is a ring back tone location service based on the identifier of the ring back tone location service. The ring back tone device 103 sends a positioning request to the location service platform 104, and the positioning request includes the called number acquired from the call.

In this Block, if the location service platform 104 and the ring back tone device 103 are separate network entities and connected to each other via an Le interface, the ring back tone device 103 sends the positioning request to the location service platform 104 in the network via the Le interface.

Further, when receiving the call, the ring back tone device 103 may perform the process of establishing a connection between the terminal of calling party 101 and the terminal of called party 105, or the MSC establishes a voice channel connection which does not pass through the ring back tone device 103.

Preferably, in the present invention, configuration for ring back tone location service users may be performed in the ring back tone device 103 in advance. Accordingly, in this Block, upon receiving the call and the identifier of the ring back tone location service, the ring back tone device 103 may determine, based on the configuration, whether to continue the subsequent process for providing location information. The detailed implementation process includes the following three manners.

In a first manner, a user subscribing to the ring back tone location service, i.e. a user who has a subscription record of ring back tone location service, configures the corresponding relation between the number of the user and one or more numbers of other users in advance in the ring back tone device by the Internet, a telephone, etc.

When the process of configuring above is performed by the called party, i.e., the user having the subscription record of ring back tone location service is a user to be positioned (i.e. the called party), what the called party has configured is the corresponding relation between the called number and one or more numbers of calling parties, which is called a first corresponding relation. The ring back tone device 103 stores the first corresponding relation. In this Block, after receiving the call and the identifier of the ring back tone location service and before sending the positioning request, the ring back tone device 103 determines whether the calling number and the called number acquired from the call satisfy the first corresponding relation stored in the ring back tone device 103. In other words, the ring back tone device 103 determines whether there is a corresponding relation between the calling number and the called number of the call in the first corresponding relation. If there is a corresponding relation between the calling number and the called number of the call in the first corresponding relation, the ring back tone device 103 continues the process of sending a positioning request containing the called number acquired from the call to the location service platform 104 in this Block. Otherwise, the process of providing location information is terminated.

If the process of configuring is performed by the calling party, i.e., the user having the subscription record of ring back tone location service is the user to perform positioning (i.e. the calling party), what the calling party has configured is a corresponding relation between the calling number and one or more called numbers. The ring back tone device 103 sends a location service setting request (e.g. ring back tone location service setting request) to the called numbers in the corresponding relation between the calling number and one or more called numbers which is configured by the calling party. The user terminals of the called parties receiving the location service setting request return a setting response message to the ring back tone device 103 if the user terminals agree that the calling party may position the user terminals themselves in the subsequent process. The ring back tone device 103 stores the corresponding relation between the calling number and the numbers of the called parties returning a setting response message as a second corresponding relation. Accordingly, in this Block, upon receiving the call and the identifier of the ring back tone location service, the ring back tone device 103 first determines whether the calling number and the called number acquired from the call satisfy the second corresponding relation. If the second corresponding relation is satisfied, the ring back tone device 103 sends the positioning request containing the called number acquired from the call to the location service platform 104; otherwise, the process of providing location information is terminated.

In a second manner, a user presets a period for the ring back tone location service by means of the Internet, a telephone, etc. in the ring back tone device 103. In Block 206, upon receiving the call and the identifier of the ring back tone location service, the ring back tone device 103 determines whether the current time of receiving the call and the identifier of the ring back tone location service is within the period for the ring back tone location service. If the current time is within the period for the ring back tone location service, the ring back tone device 103 sends the positioning request containing the called number to the location service platform 104; otherwise, the process of providing location information is terminated.

In a third manner, a user presets a period for the ring back tone location service and a corresponding relation between the number of the user and the period for the ring back tone location service by means of the Internet, a telephone, etc. in the ring back tone device 103. For example, the period for the ring back tone location service is set as 20:00~24:00. In Block 206, upon receiving the call and the identifier of the ring back tone location service, the ring back tone device 103 determines whether the current time of receiving the call and the identifier of the ring back tone location service is within the period for the ring back tone location service. If the current time is within the period for the ring back tone location service, the ring back tone device 103 determines whether the number of the user of the call is found in the corresponding relation between the number of the user and the period for the ring back tone location service. If the number of the user of the call is found in the corresponding relation, the ring back tone device 103 continues the process of sending the positioning request containing the called number acquired from the call to the location service platform 104 in this Block. If the number of the user of the call is not in the corresponding relation, the process of providing location information is terminated.

The first manner to the third manner may be combined arbitrarily in practical services. In other words, the ring back tone device 103 may determine whether to send the positioning request according to one or more of the above manners upon receiving the call and the identifier of the ring back tone location service. For example, in Block 206, the ring back tone device 103 determines sends the positioning request if the current time is within the period for the ring back tone location service upon determining that the calling party and the called party of the call satisfy a corresponding relation.

Alternatively, the first corresponding relation, the second corresponding relation and the period for the ring back tone location service may be set in the HLR or the SCP. The switch and control system determines whether the first corresponding relation and/or the second corresponding relation are satisfied, and/or whether the current time is within the period for the ring back tone location service s. If no, the call would not be connected to the ring back tone device 103, and the time for providing location information is saved.

In Block 207, upon receiving the positioning request containing the called number, the location service platform 104 acquires the called number from the positioning request, and acquires the longitude-latitude coordinates of the area where the terminal of called party 105 is located according to the called number.

In this Block, the process of acquiring the location information of the terminal of called party 105 is a prior art, and a simple example for the process may be given below: the location service platform 104 acquires the location information of the terminal of called party 105 according to the positioning technology based on a mobile communication network. For example, after the terminal of called party 105 enters a cell covered by a base station, the identifier of the cell is stored in the HLR corresponding to the switch and control system 102, and the location service platform 104 sends a positioning request of Mobile Application Part (MAP) signaling to the HLR, and the positioning request contains the number of the terminal of the called party. The HLR acquires the identifier of the cell according to the number of the terminal of the called party and sends the identifier of the cell to the location service platform 104 via the MAP signaling. The location service platform 104 acquires the longitude-latitude coordinates of the cell corresponding to the identifier of the cell according to the corresponding relation between an identifier of a cell and a longitude-latitude coordinates of a cell. In other words, the location service platform 104 acquires the longitude-latitude coordinates of the area where the terminal of called party 105 is located.

If the terminal of called party 105 supports the satellite positioning function, the location service platform 104 acquires the longitude-latitude coordinates of the area where the terminal of called party 105 is located according to the positioning technology based on mobile terminals.

In Block 208, the location service platform 104 converts the longitude-latitude coordinates of the area where the terminal of called party 105 is located into the location information of the terminal of called party 105 in a user understandable form using the GIS in the location service platform 104.

In this embodiment, the process for converting the longitude-latitude coordinates into the location information in the user understandable form is a prior art, and a simple example may be given as that the location service platform 104 converts the longitude-latitude coordinates of the area where the terminal of called party 105 is located into the geographical name and/or the building and building name of the geographical area where the terminal of called party 105 is located using the GIS.

In Block 209, the location service platform 104 sends the location information of the terminal of called party 105 in the user understandable form to the ring back tone device 103.

If the GIS is set in the ring back tone device 103, Block 209 should not be performed, and the location service platform 104 directly sends the longitude-latitude coordinates of the area where the terminal of called party 105 is located to the ring back tone device 103 when process of Block 210 is performed. Upon receiving the longitude-latitude coordinates, the ring back tone device 103 converts the longitude-latitude coordinates of the area where the terminal of called party 105 is located into the location information of the terminal of the called party in a user understandable form using the GIS.

In Block 210, the ring back tone device 103 sends the location information of the terminal of called party 105 in the user understandable form to the terminal of calling party 101.

In Blocks 209 and 210, the location service platform 104 and the ring back tone device 103 may send the location information of the terminal of the called party in the user understandable form with a voice format, a text format or a multimedia format. If the location information of the terminal of the called party in the user understandable form received by the ring back tone device 103 in Block 209 is in a text format, the ring back tone device 103 may convert the location information of the terminal of the called party in the user understandable form with the text format into that with a voice format. The ring back tone device 103 sends the location information with a voice format to the terminal of calling party 101.

Block 210 may be implemented in the following manners.

First, upon receiving the location information of the terminal of the called party, the ring back tone device 103 sends the ordinary customized ring back tone and the location information of the terminal of the called party simultaneously to the terminal of calling party 101, if the user of the call (i.e. the calling party and/or the called party) is a customized ring back tone service user, i.e., the user of the call sets an ordinary customized ring back tone at the same time.

Second, it is set in the ring back tone device 103 in advance that different location information corresponds to different ordinary customized ring back tones. If the user of the call, i.e. the calling party and/or the called party, has set an ordinary customized ring back tone, the ring back tone device 103 acquires the ordinary customized ring back tone corresponding to the location information of the terminal of the called party upon receiving the location information of the terminal of the called party, and sends the ordinary customized ring back tone corresponding to the location information of the terminal of called party to the terminal of calling party 101.

Third, normal location information is set in the ring back tone device 103 in advance. The normal location information refers to a set of location information. For example, the normal location information is set as in a certain school when positioning a student in school time. Upon receiving the location information of the terminal of the called party, the ring back tone device 103 determines whether the location information of the terminal of the called party is the same as the normal location information set in advance, if the user of the call, i.e. the calling party and/or the called party, has set an ordinary customized ring back tone. If it's the same, the ring back tone device 103 sends the ordinary customized ring back tone to the terminal of calling party 101. If it's different, the ring back tone device 103 sends the location information of the terminal of the called party to the terminal of calling party 101.

Fourth, the ring back tone device 103 determines whether the location information of the terminal of the called party has been sent completely upon receiving an off-hook signal of the terminal of called party 105 during the process of the ring back tone device 103 sending the location information of the terminal of the called party to the terminal of calling party 101. The ring back tone device 103 keeps on sending the location information of the terminal of the called party if the location information of the terminal of the called party has not been sent completely.

Fifth, the ring back tone device 103 sends the location information of the terminal of the called party to the terminal of calling party 101. Upon sending the location information completely, the ring back tone device 103 determines whether an off-hook signal of the terminal of called party 105 has been received. If an off-hook signal of the terminal of called party 105 has not been received, the ring back tone device 103 sends the ordinary customized ring back tone set by the user of the call to the terminal of calling party 101, upon determining that the user of the call, i.e. the calling party and/or the called party, has set an ordinary customized ring back tone.

Further, the ring back tone device 103 may receive information that the terminal of called party 105 is unreachable after receiving the call in Block 207 and before performing Block 210. In this case, the process of the present invention may still be continued. For example, in Block 210, when receiving the location information of the terminal of the called party as well as the information that the terminal of called party 105 is unreachable, the ring back tone device 103 may continue to send the location information of the terminal of the called party to the terminal of calling party 101. The above location information of the terminal of the called party may be the longitude-latitude coordinates or the location information of the terminal of the called party in a user understandable form, such as a name of a geographical area and a name of a building.

Figure 3:
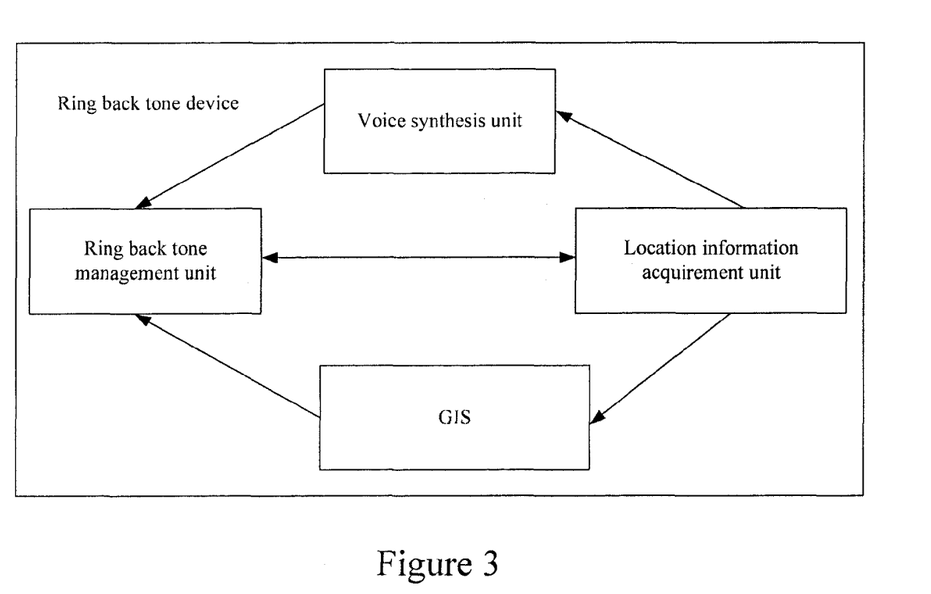
FIG. 3 shows a schematic diagram illustrating the structure of a ring back tone device in accordance with an embodiment of the present invention.

FIG. 3 shows a schematic diagram illustrating the structure of the ring back tone device of the present invention. The present invention also provides a ring back tone device. As shown in FIG. 3, the ring back tone device includes a ring back tone management unit and a location information acquirement unit. The ring back tone device may further include a speech synthesis unit and a GIS.

The ring back tone management unit receives a call connected by the switch and control system in the network, manages the transmission of a ring back tone to the terminal of the calling party, acquires the called number from the call and sends the called number to the location information acquirement unit, and further sends the location information of the terminal of the called party to the terminal of the calling party.

The location information acquirement unit sends a positioning request containing the called number to the location service platform upon receiving the called number sent by the ring back tone management unit, and sends the location information of the terminal of the called party to the ring back tone management unit upon receiving the location information of the terminal of the called party sent by the location service platform.

As shown in FIG. 3, when the ring back tone device further includes the speech synthesis unit, the speech synthesis unit is connected to the ring back tone management unit and the location information acquirement unit respectively, and the location information of the terminal of the called party received by the location information acquirement unit is in a text format. In this case, the location information acquirement unit further sends the location information of the terminal of the called party in a text format to the speech synthesis unit. The speech synthesis unit converts the location information of the terminal of the called party in a text format into that in a voice format, and sends the location information of the terminal of the called party in the voice format to the ring back tone management unit. The location information of the terminal of the called party sent by the ring back tone management unit to the terminal of the calling party is in the voice format.

As shown in FIG. 3, when the ring back tone device further includes a GIS, the GIS is connected to the ring back tone management unit and the location information acquirement unit respectively. The location information of the terminal of the called party received by the location information acquirement unit is the longitude-latitude coordinates of the geographical area where the terminal of the called party is located. The location information acquirement unit further sends the longitude-latitude coordinates of the geographical area where the terminal of the called party is located to the GIS. The GIS converts the longitude-latitude coordinates of the geographical area where the terminal of the called party is located into the location information of the terminal of the called party in a user understandable form, and sends the location information of the terminal of the called party in a user understandable form to the ring back tone management unit. The location information of the terminal of the called party sent by the ring back tone management unit to the terminal of the calling party is the location information of the terminal of the called party in a user understandable form.

It should be emphasized that the above-described embodiments, particularly, any preferred embodiments, are merely possible examples of implementations, merely set forth for a clear understanding of the principles of the invention. Many variations and modifications may be made to the above-described preferred embodiments without departing substantially from the spirit and principles of the invention. All such modifications and variations are intended to be included herein within the scope of this disclosure and the above-described preferred embodiments and protected by the following claims.

What is claimed is:

1. A method for providing location information, comprising:

receiving, by a ring back tone device, a call with a called number for a called party from a calling party;

sending a positioning request including the called number of the call;

receiving location information of a terminal of the called party based on the called number;

comparing the received location information to a pre-defined normal location to determine whether the location of the terminal is a one of inside and outside a normal location; and generating a user-understandable form of the location information of the terminal of the called party to a calling party of the call only when the location of the terminal of the called party is compared to be outside the normal location;

generating a ring back tone excluding location information of the terminal of the called party to the calling party when the location of the terminal of the called party is compared to be inside the normal location;

sending a one of the user-understandable form of the location information or the ring back tone to the calling party;
wherein the call is connected to the ring back tone device based on a route address of the ring back tone device if there is a subscription record of ring back tone location service corresponding to a user of the call;
wherein the subscription record of ring back tone location service corresponding to the user of the call and the route address of the ring back tone device are set in a Home Location Register; wherein
the call is connected to the ring back tone device by a Mobile Switching Center based on the route address of the ring back tone device if there is the subscription record of ring back tone location service corresponding to the user of the call; and
the Mobile Switching Center acquires the subscription record of ring back tone location service corresponding to the user and the route address of the ring back tone device from the Home Location Register.

2. A method for providing location information, comprising:
receiving, by a ring back tone device, a call with a called number for a called party from a calling party;
sending a positioning request including the called number of the call;
receiving location information of a terminal of the called party based on the called number;
comparing the received location information to a pre-defined normal location to determine whether the location of the terminal is a one of inside and outside a normal location; and
generating a user-understandable form of the location information of the terminal of the called party to a calling party of the call only when the location of the terminal of the called party is compared to be outside the normal location;
generating a ring back tone excluding location information of the terminal of the called party to the calling, party when the location of the terminal of the called party is compared to be inside the normal location; and
sending a one of the user-understandable form of the location information or the ring back tone to the calling party,
wherein the call is connected to the ring back tone device based on a route address of the ring back tone device if there is a subscription record of ring back tone location service corresponding to a user of the call;
wherein the subscription record of ring back tone location service corresponding to the user and the route address of the ring back tone device are set in a Service Control Point; and
the call is reported, by a switching device to the Service Control Point; and
the Service Control Point triggers the switching device to connect the call to the ring back tone device based on the route address of the ring back tone device if there is the subscription record of ring back tone location service corresponding to the user of the call.

3. A system for providing location information, comprising:
a switch and control system, capable of switching and controlling communication between a calling party and a called party, and connecting a call with a called number for a called party from a calling party;
a ring back tone device, capable of receiving the call from the switch and control system, sending a positioning request including the called number, receiving location information of a terminal of the called party;
a location service platform. capable of receiving the positioning request including the called number from the ring back tone device, acquiring the location information of the terminal of the called party based on the called number in the positioning request, and sending the location information to the ring back tone device;
wherein the ring back tone device is further capable of
comparing the received location information to a pre-defined normal location to determine whether the location of the terminal is a one of inside and outside a normal location; and
generating a user-understandable form of the location information of the terminal of the called party to a calling party of the call only when the location of the terminal of the called party is compared to be outside the normal location;
generating a ring back tone excluding location information of the terminal of the called party to the calling party when the location of the terminal of the called party is compared to be inside the normal location; and
sending a one of the user-understandable form of the location information or the ring back tone to the calling party;
wherein the switch and control system comprises:
a Home Location Register, capable of storing a subscription record of ring back tone location service corresponding to a user and a route address of the ring back tone device; and
a Mobile Switching Center, for acquiring the subscription record of ring back tone location service corresponding to a user and the route address of the ring back tone device from the Home Location Register, and connecting the call to the ring back tone device based on the route address of the ring back tone device upon determining that there is a subscription record of ring back tone location service corresponding to a user of the call.

4. A system for providing location information, comprising:
a switch and control system, capable of switching and controlling communication between a calling party and a called party, and connecting a call with a called number for a called party from a calling party;
a ring back tone device, capable of receiving the call from the switch and control system, sending a positioning request including the called number, receiving location information of a terminal of the called party;
a location service platform, capable of receiving the positioning request including the called number from the ring back tone device, acquiring the location information of the terminal of the called party based on the called number in the positioning request, and sending the location information to the ring back tone device;
wherein the ring back tone device is further capable of
comparing the received location information to a pre-defined normal location to determine whether the location of the terminal is a one of inside and outside a normal location; and
generating a user-understandable form of the location information of the terminal of the called party to a calling party of the call only when the location of the terminal of the called party is compared to be outside the normal location;
generating a ring back tone excluding location information of the terminal of the called party to the calling party when the location of the terminal of the called party is compared to be inside the normal location; and sending a one of the user-understandable form of the location information or the ring back tone to the calling party;

wherein the switch and control system comprises:

a switching device, for receiving the call, reporting information of the call, and connecting the call to the ring back tone device upon receiving a route address of the ring back tone device; and a Service Control Point, for storing a subscription record of ring back tone location service corresponding to a user and the route address of the ring back tone device, and instructing, based on the route address of the ring back tone device, the switching device to connect the call to the ring back tone device upon determining, based on the information of the call, that there is a subscription record of ring back tone location service corresponding to a user of the call.

* * * * *